Patented July 2, 1940

2,206,619

UNITED STATES PATENT OFFICE 2,206,619

WHEAT CRISP

Konrad F. Schreier, Highland Park, Ill.

No Drawing. Application August 4, 1939, Serial No. 288,448

8 Claims. (Cl. 99—90)

This invention relates to a wheat crisp product and the method of preparing the same.

Various products commonly known as rye crisp are on the market, but up to the present time it has proved impossible to prepare a wheat product of corresponding properties.

It has now been discovered that the difficulty with wheat flour has been that the gluten produced by the protein material thereof is too tough and when baked under conditions to produce a dry flaky crisp biscuit, forms a tough material which in its exaggerated form is like hardtack.

In accordance with its invention this difficulty may be overcome by proper treatment of the wheat flour in order to prevent agglutination. In addition, the treated flour is preferably mixed within certain ranges from relatively coarse bran flour and white flour.

Both the bran flour and white flour are formed from wheat which has been malted until it has developed a Lintner diastase content of 35° or more. This treatment develops not only the natural hard sugars and diastase, but also proteases and other proteolytc enzymes. A preferred product will have a Lintner diastase of 64° to 96°.

The malted wheat is made into flour in two ways. A portion of it is ground very coarsely, preferably without the addition of moisture, into a whole meal. Another portion is ground into white flour of the ordinary degree of fineness.

The dough may then be prepared in any customary manner. However, it is preferred to prepare a yeast sponge dough from malted wheat meal and malted flour without the addition of any yeast fermentable sugar. Enough water is added to make a semi-liquid mix. The mixture is permitted to ferment until the proteolytic enzymes have fully developed the proteins. A suitable period is from 90 to 540 minutes at approximately 82° F. The sponge dough is then thoroughly mixed with the flour rolled into thin sheets or flakes, perforated, proofed and baked at a temperature above 450° F. A suitable temperature is one of approximately 800° F.

The smoothness of the crisp can be improved by the addition of small amounts of shortening which may be added in the ordinary manner, preferably in amounts from 4% to 8% of the dough.

It has also been found that the oven spread of the material may be improved by the addition of a slow-acting baking powder, for example that disclosed in Schlaeger Patent 2,160,233. 1% of the acid prosphate therein disclosed and 1% of bicarbonate are quite satisfactory.

The resulting product is a crisp dry material greatly resembling rye crisp in appearance, but having an entirely distinctive flavor. The moisture content is quite low, the protein content is about like that of ordinary baked goods, being normally approximately 9% to 12%, and the product is from $\frac{1}{32}$ to $\frac{7}{32}$ inch in thickness, normally being from $\frac{3}{32}$ to $\frac{5}{32}$ in thickness.

The ratio of malted whole wheat to malted white flour may be varied within wide limits. However, a crisp made entirely from whole wheat flour has a poor taste and consistency. On the other hand, a wafer made entirely from white flour is more compact than is desirable. The preferred product contains thirteen parts of whole wheat flour and eighteen parts of white flour. It is understood that both of these materials have been malted as described. The whole wheat content should be within the range of from 10% to 75% and the while flour within the range of 90% to 25% of the cereal content. Small amounts of unmalted white flour may be included where desirable. Wafers may also be salted on the surface if desired.

While the discussion heretofore has largely concerned wafers, the material may be crushed or may be formed initially in flakes or other granular form. When flaked or granulated it makes a very satisfactory prepared breakfast food. The term "wafery material" is used to designate material of wafer thickness regardless of the ratio of diameter to surface area.

While the basis of the action has not been established beyond the possibility of a doubt, it appears that the protein gliadin and glutenin which are present in the wheat and which combine in the dough to form gluten are acted upon by the proteolytic enzymes developed in the malting process. As a result of this action upon the proteins in the dough, the formation of gluten is substantially avoided.

Wha; I claim as new, and desire to secure by Letters Patent, is:

1. The method of preparing crisp wheat wafery material of substantial thickness which comprises preparing a dough of malted wheat flour having a Lintner diastase of 35° or more, fermenting the dough mix for a period sufficient for the proteolytic enzymes to act upon the proteins of the flour, and then dividing the dough into thin layers and baking at a high temperature.

2. The method of preparing crisp wheat wafery material of substantial thickness which comprises preparing a dough of malted wheat flour having a Lintner diastase of approximately 64° to 96°, fermenting the dough mix for a period sufficient for the proteolytic enzymes to act upon the proteins of the flour, and then dividing the dough into thin layers and baking at a high temperature.

3. The method of preparing crisp wheat wafery material of substantial thickness which comprises preparing a dough of malted wheat flour having a Lintner diastase of 35° or more, the flour being from 10% to 75% coarse bran flour and from 25% to 90% white flour, fermenting the dough mix for a period sufficient for the proteolytic enzymes to act upon the proteins of the flour, and then dividing the dough into thick layers and baking at a high temperature.

4. The method of preparing a crisp wheaten wafery material which comprises preparing a yeast sponge dough from an aqueous dough mix containing as its cereal ingredient coarsely ground whole wheat malt having a Lintner diastase of the order of 64° to 96°, fermenting the dough until the gluten-forming proteins have been disintegrated, adding white flour of substantially the same diastase content as the whole wheat flour to the dough mix, the white flour being from 25% to 90% and the whole wheat flour from 10% to 75% of the cereal content of the dough, dividing the dough into thin sheets, and baking.

5. A baked crisp wheaten wafery material having a thickness of approximately $\frac{1}{32}$ to $\frac{7}{32}$ of an inch, containing as its cereal ingredient malted wheat flour of at least 35° Lintner diastase.

6. A baked crisp wheaten wafery material having a thickness of approximately $\frac{1}{32}$ to $\frac{7}{32}$ of an inch, containing as its cereal ingredient malted wheat flour of approximately 64° to 96° Lintner diastase.

7. A baked crisp wheaten wafery material having a thickness of approximately $\frac{1}{32}$ to $\frac{7}{32}$ of an inch, containing as its cereal ingredient malted wheat flour of at least 35° Lintner diastase, the malted flour comprising from 25% to 90% white processed flour and from 10% to 75% coarsely ground whole wheat flour.

8. A baked crisp wheaten wafery material having a thickness of approximately $\frac{1}{32}$ to $\frac{7}{32}$ of an inch, containing as its cereal ingredient malted wheat flour of approximately 64° to 96° Lintner diastase; the malted wheat flour consisting essentially of thirteen parts of coarsely ground whole wheat flour and eighteen parts of processed white flour.

KONRAD F. SCHREIER.

CERTIFICATE OF CORRECTION.

Patent No. 2,206,619.  July 2, 1940.

KONRAD F. SCHREIER.

It is hereby certified that error appears in the printed specification of the above numbered patent requiring correction as follows: Page 1, second column, line 20, for the word "while" read --white--; page 2, first column, line 14, claim 3, for "thick" read --thin--; and that the said Letters Patent should be read with this correction therein that the same may conform to the record of the case in the Patent Office.

Signed and sealed this 17th day of September, A. D. 1940.

(Seal)

Henry Van Arsdale,
Acting Commissioner of Patents.